United States Patent [19]
Gilmore et al.

[11] Patent Number: 5,803,174
[45] Date of Patent: Sep. 8, 1998

[54] GROUNDWATER WELL WITH REACTIVE FILTER PACK

[75] Inventors: Tyler J. Gilmore, Pasco; George R. Holdren, Jr., Kennewick; Daniel I. Kaplan, Richland, all of Wash.

[73] Assignee: Battelle Memorial Institute, Richland, Wash.

[21] Appl. No.: 775,319

[22] Filed: Dec. 31, 1996

[51] Int. Cl.⁶ .................................................. E21B 33/13
[52] U.S. Cl. .......................................... 166/292; 405/264
[58] Field of Search ........................... 166/265, 292–295, 166/300; 405/263, 264

[56] References Cited

U.S. PATENT DOCUMENTS

| | | | |
|---|---|---|---|
| 4,936,386 | 6/1990 | Colangelo | 405/263 X |
| 5,380,126 | 1/1995 | Bernhardt | 405/128 |
| 5,425,598 | 6/1995 | Pennington | 405/128 |
| 5,464,309 | 11/1995 | Mancini et al. | 405/128 X |

Primary Examiner—Roger J. Schoeppel
Attorney, Agent, or Firm—Douglas E. McKinley, Jr.; Paul W. Zimmerman

[57] ABSTRACT

A method and apparatus for the remediation of contaminated soil and ground water wherein a reactive pack material is added to the annular fill material utilized in standard well construction techniques.

6 Claims, 3 Drawing Sheets

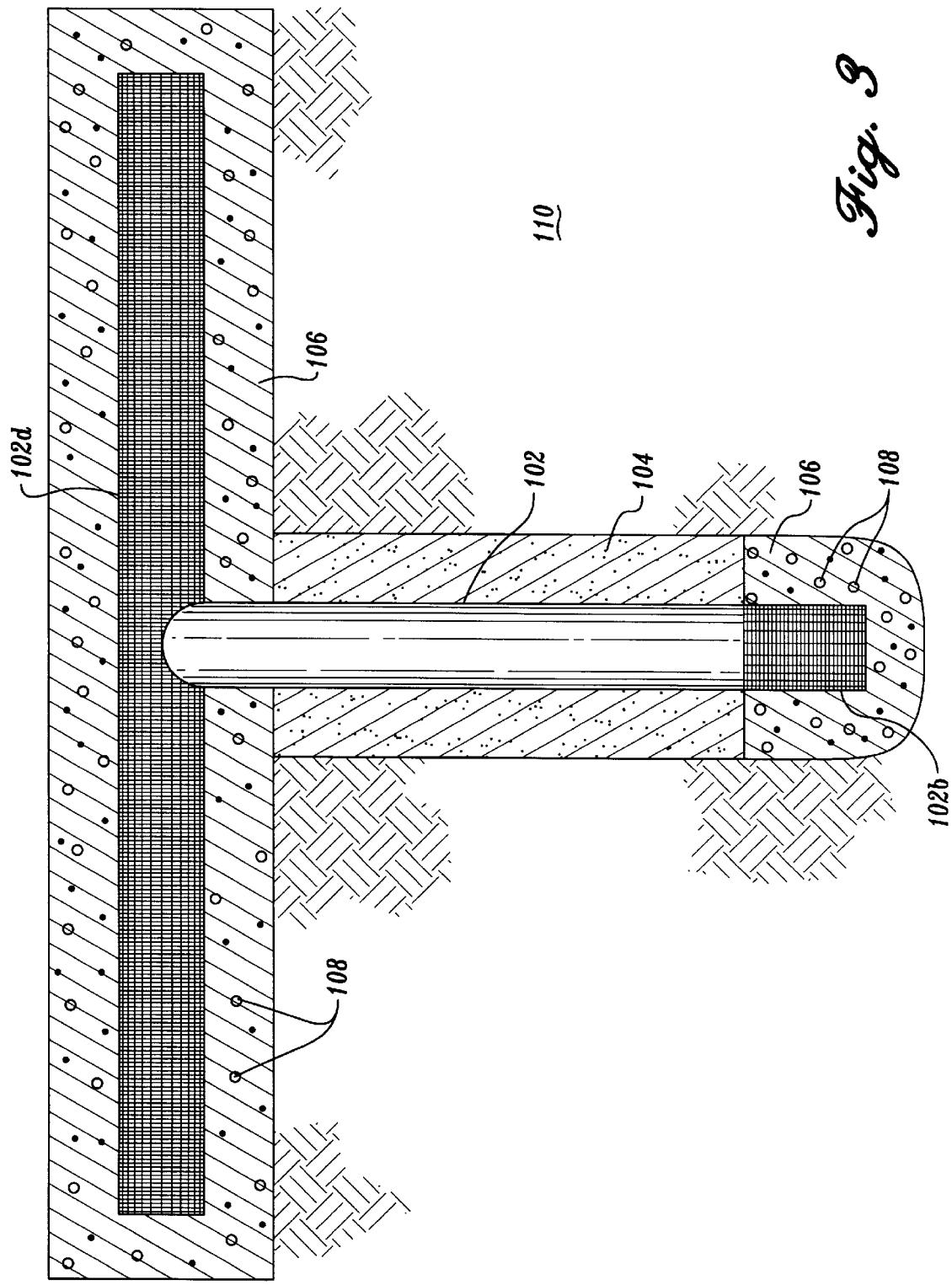

GROUNDWATER WELL WITH REACTIVE FILTER PACK

This invention was made with Government support under Contract DE-AC06-76RLO 1830 awarded by the U.S. Department of Energy. The Government has certain rights in the invention.

FIELD OF THE INVENTION

The present invention relates generally to a method for the remediation of contaminated soil and ground water and more particularly to a method for remediation of contaminated soil and ground water wherein a reactive filter pack is added to the annular fill material utilized in standard well construction techniques.

BACKGROUND OF THE INVENTION

Numerous systems employed in the remediation of soils and ground water are known in the prior art. The implementation of some of these prior art remediation systems utilize features of standard well construction techniques. However, these prior art remediation systems are not necessarily compatible with the most cost effective well construction techniques.

One known method for soil and ground water remediation utilizing some of the features of standard well construction techniques is disclosed in U.S. Pat. No. 5,380,126, Method of and Arrangement for Rinsing Out Impurities from Ground issued to Bernhardt (hereafter the '126 patent). In the 126 patent, Bernhardt discusses generally the formation of a well wherein the water pumped through the well is directed through a filter or cleaning device placed in the interior of the well casing. Ground water so directed will capture impurities or contaminants leached or dissolved from the surrounding soils into the groundwater, thus passing impurities or contaminants from the surrounding soils to the filter or cleaning device.

The '126 patent also discusses an arrangement wherein the system is configured to recirculate the groundwater to accomplish multiple opportunities for the filter or cleaning device to remove or adhere contaminants. In this manner, the soil is continually bathed in the ground water, which is in turn continually passed through the filter or cleaning device to remove the impurities or contaminants present in the surrounding soil resulting in more complete remediation.

Also known in the art are a great variety of filters or cleaning devices used to remove contaminants from the soils and groundwater. One class of such devices are more accurately characterized as materials, hereinafter "pack" materials, which remove contaminants by either adhering to a contaminant of interest or by either chemically reacting with the contaminant of interest or catalyzing a chemical reaction involving the contaminant of interest wherein the contaminant is transformed into a form which will adhere to the pack material or into a benign form which is no longer desirable to remove or remediate from the soil or ground water.

A great many different pack materials are known in the art, and the selection of a given pack material is typically dependent upon the specific contaminant or group of contaminants which the user desires to remove from the soil or groundwater. Regardless of the specific contaminant or pack material selected for a given application, in general, it is desirable to maximize the volume of the pack material, thereby maximizing the available reactive interface between the pack materials and the contaminants to be removed from the groundwater, given a set flow rate of groundwater through the pack materials. Stated differently, by maximizing the volume of pack material, a greater volume of groundwater may be directed through the pack material in a given time interval while holding constant the time available at the reactive interface between the contaminants of interest and the pack materials. In this manner, the overall efficiency of the decontamination process is maximized.

Systems such as those described in the '126 patent, which incorporate a filter or cleaning device within the well casing, are thus confined by the dimensions of the well casing in the volume of pack material which may be made available to the groundwater. Of course, the well casing may be enlarged to allow an increase in the volume of packing material, however, to accommodate an increase in the dimensions of the well casing, the bore hole into which the well casing is inserted must also be enlarged. Since the volume of material which must be removed from the bore hole increases by the square of any increase in the radius multiplied by the constant pi, a small increase in the amount of pack material Made available to the ground water according to the prior art systems results in a large increase in the dimensions of the required well casing and an even greater increase in the required dimensions of the required bore hole. Such an increase adds significantly to the cost of constructing the overall system. Alternatively, such a system often places unacceptable limitations of the amount of pack material available for exposure to the ground water and a concomitant reduction in the efficiency of the overall system in removing contaminants from the groundwater.

Accordingly, in the construction of ground water remediation systems utilizing standard well construction techniques, a need still remains for a method of providing a maximum volume of pack materials while at the same time holding constant or minimizing the dimensions of the required bore hole and well casing.

SUMMARY OF THE INVENTION

This invention relates to a method of providing pack materials useful in adhering or reacting with contaminants in groundwater as part of a standard well construction technique. In a standard well, a bore hole is first drilled into the ground. A well casing is then inserted into the bore hole. Normally, the well casing houses a pumping mechanism or other mechanical components which comprise the operational features of the particular well.

The well casing will normally include a portion that is permeable to groundwater. The remainder of the well casing is typically impermeable to insure proper hydraulic flow of the liquids through the well casing, as dictated by the design of the casing.

The space in between the exterior surface of the well casing and the interior surface of the bore hole is then filled with an annular fill material. This annular fill material may be a impermeable sealing material, such as a clay material, or it may be a permeable material such as gravel or sand. Typically both types of fill material are utilized such that the permeable fill material surrounds those portions of the well casing which are permeable and the impermeable or sealing fill materials surround the portions of the well casing which are not permeable, resulting in a layering of the permeable and nonpermeable fill materials.

The operation of the well then produces a hydraulic flow wherein groundwater is caused to flow through the permeable fill material and to the interior of the well casing through the permeable portion of the well casing. The present invention involves the introduction of pack materials into the fill material resulting in the neutralization, stabilization or removal of contaminants from the groundwater. According to the present invention, the groundwater may then be recirculated to transport additional contaminants located either in the ground water or in the surrounding soils, through the pack material to further remediate the ground water and the surrounding soils.

Several types of materials are suitable for use as pack materials according to the present invention. By way of example, these pack materials may be described as falling into one of five classes; Reductive, Oxidizing, Biological, Adsorbents and Precipitation. As will be apparent to those skilled in the art, each of these classes of materials is most advantageously utilized for certain contaminants. Again, by way of example, Reductive pack materials would generally include zero-valent metals such as iron, copper, zinc, palladium or mixtures thereof. Also suitable as Reductive pack materials would be minerals containing reducible iron such as montmorillonite and nontrinite. These Reductive pack materials are then most advantageously employed in the remediation of soils and ground water containing contaminants suitable for advantageous reaction with reductive materials, including, but not limited to, chromium, uranium, molybdenum, technetium, copper, silver, mercury, nitrates, carbon tetrachloride, chloroform, hexachloroethane, tetrachloroethane, trichloroethane, tetrachloroethane, Freon, trinitrotoluene (TNT), octahydro-1,3,5,7-tetranitro-1,3,5,7-tetrazocine (HMX) and mixtures thereof.

Oxidizing pack materials would most be utilized most advantageously in remediation of contaminants such as arsenic and would include, but not be limited to titanium oxides, manganese oxides and combinations thereof. Biological pack materials would be utilized most advantageously in remediation of contaminants such as chromium, uranium, molybdenum, technetium, copper, silver, mercury, nitrates, carbon tetrachloride, chloroform, hexachloroethane, tetrachloroethane, trichloroethane, tetrachloroethane, Freon, trinitrotoluene (TNT), octahydro-1,3,5,7-tetranitro-1,3,5,7-tetrazocine (HMX), hydrophobic contaminants such as PCB's and oil products, and mixtures thereof and would include, but not be limited to microbes, enzymes and combinations thereof.

Adsorbent pack materials would most advantageously be utilized in remediation of contaminants such as cadmium, mercury, strontium, cesium, lead, chromium, mercury, uranium, benzene, toluene, ethylbenzene, propylbenzene, butylbenzene, naphthalene and biphenyl and would include, but not be limited to high adsorption capacity clays such as zeolites, montmorillonite, bentonite; surface modified clays such as quaternary amine modified clays, and combinations thereof.

Precipitation pack materials would most advantageously be utilized in remediation of contaminants such as lead, zinc and cadmium and would include, but not be limited to hydroxyapatite, calcite, and combinations thereof.

OBJECTS

Accordingly, it is an object of the present invention in one of its embodiments to provide an improved method for remediating ground water in a well constructed according to standard well construction methods consisting essentially of a well casing placed within the interior of a bore hole, wherein fill material is disposed around the exterior surface of the well casing and thus interposed between the well casing and the interior surface of the bore hole.

It is a further object of the present invention to provide the addition of a pack material to the fill material in standard well construction described above wherein the pack material is suitable for remediation of contaminants present in groundwater circulated through the pack material in the operation of the pump. As used herein, the term "remediation" refers to any process whereby a contaminant present in the groundwater and transported to or through the pack material is stabilized within the pack material, either by adherence, absorption, adsorption or otherwise, or any process whereby the contaminant of interest is transformed into a benign or stabilizable compound either due to a chemical reaction with the pack material, or a chemical reaction catalyzed by the pack material, or combinations thereof.

It is a further object of the present invention to maximize the volume of pack material available for remediation of contaminants present in groundwater and circulated through the pack material in the operation of the pump, while minimizing the dimensions of the bore hole containing the fill material.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3 is a schematic drawing of a third preferred embodiment of the present invention showing a cut away view of a modified circulating well and the relative position of the pack material.

DESCRIPTION OF THE PREFERRED EMBODIMENT(S)

Figure 1:
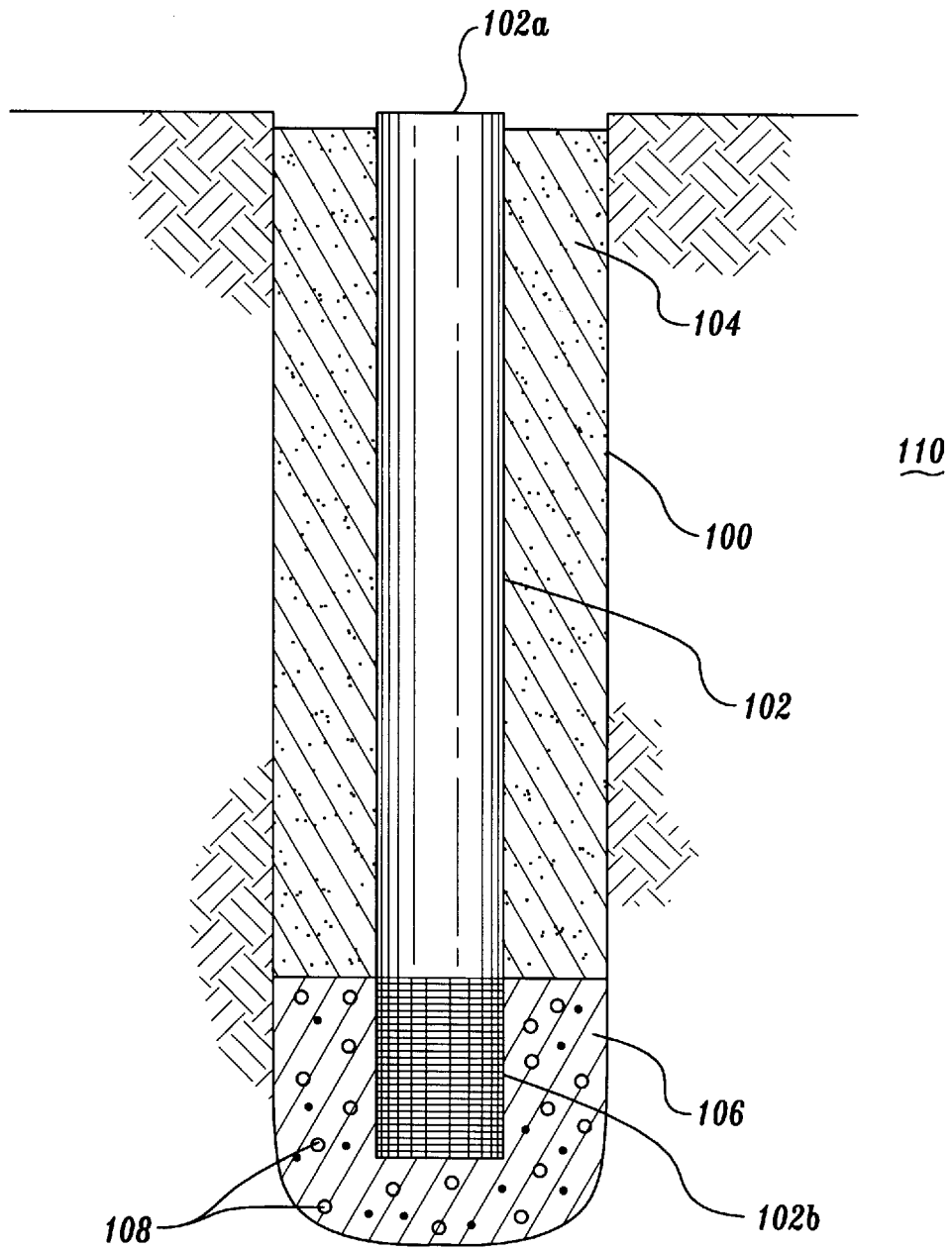
FIG. 1 is a schematic drawing of a first preferred embodiment of the present invention showing a cut away view of a standard well and the relative position of the pack material.

A first preferred embodiment of the present invention is illustrated in FIG. 1. A bore hole 100 is first provided which extends into the ground 110. A well casing 102 having an upper end 102a and a lower end 102b is placed inside the bore hole 100 which houses a pump (not shown). The lower end of well casing is permeable and thus allows surrounding water to be drawn into the well casing 102 through the operation of the pump. In the space evacuated by the bore hole 100 and in between the well casing 102 and the ground 110 is deposited an annular fill material 104 and 106. An impermeable fill material 104 surrounding the upper end 102a of the well casing 102 is a sealing material, such as a clay material. At the lower end 102b of the well casing 102, the surrounding permeable fill material 106 is a permeable material such as gravel or sand. According to the present invention, added to the permeable fill material 106 is a pack material 108 suitable for remediating contaminants which may be present in the ground water. As ground water is drawn into the lower end 102b of the well casing 102, it must first pass through the permeable fill material 106. This permeable fill material 106 will in fact increase the hydraulic radius of the well. As water is drawn through the permeable fill material 106 it comes in contact with the pack material 108. Contaminants present in the ground water will then be remediated according to the selection of the pack materials 108 and the characteristics of the contaminant. For example, contaminants might be stabilized within the pack material, either by adherence, absorption, adsorption or otherwise, or contaminants may be transformed into a benign or stabilizable compound either due to a chemical reaction with the pack material, or a chemical reaction catalyzed by the pack material, or the contaminants may be remediated by some combination thereof.

Figure 2:
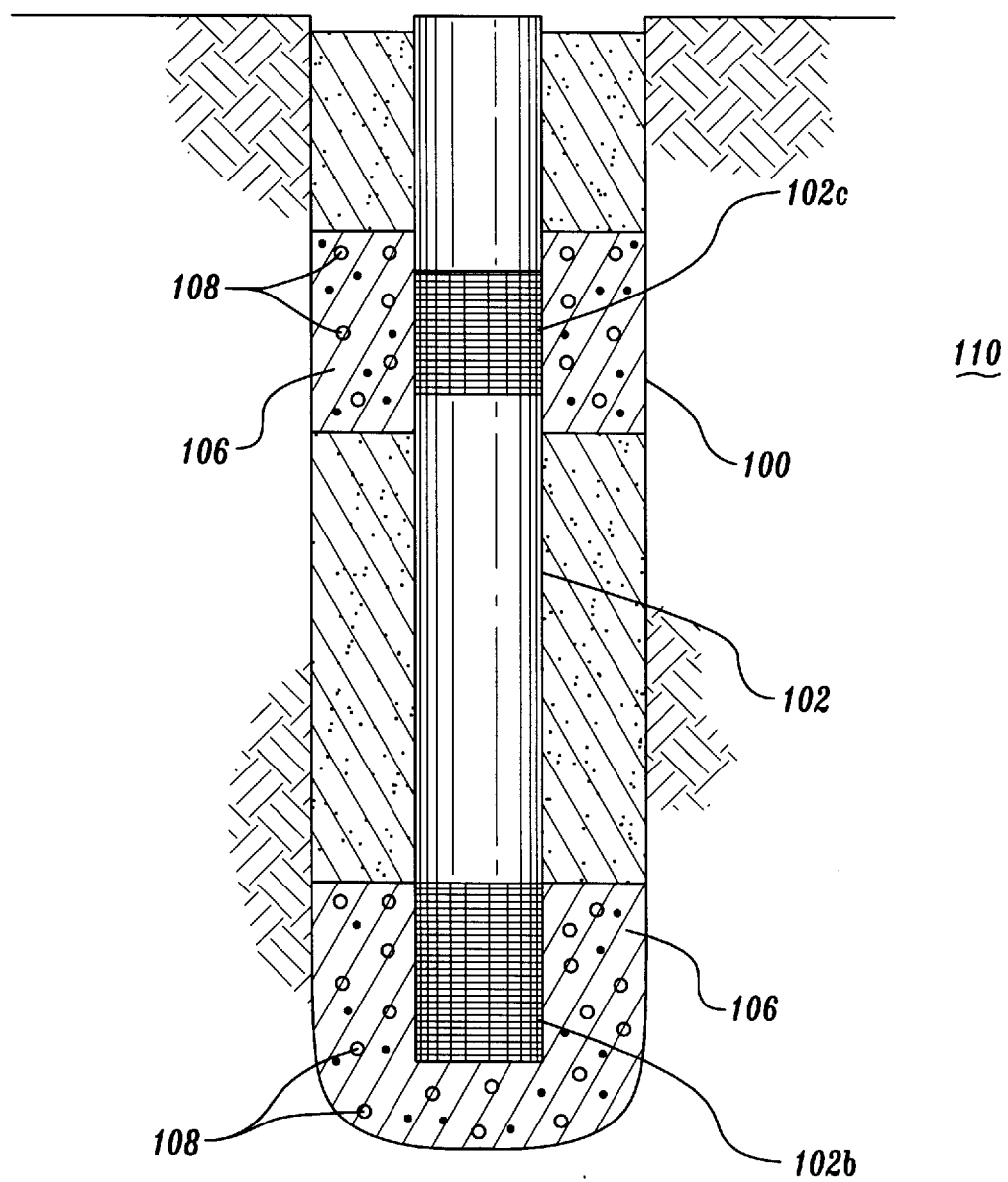
FIG. 2 is a schematic drawing of a second preferred embodiment of the present invention showing a cut away view of a standard circulating well and the relative position of the pack material.

A second preferred embodiment of the present invention is illustrated in FIG. 2. As in the first preferred embodiment, a bore hole 100 is first provided which extends into the ground. A well casing 102 is placed inside the bore hole 100 which houses a pump (not shown). In the second is preferred embodiment, both the lower end 102b of well casing 102 and a middle section 102c of the well casing 102 are permeable. Surrounding both the lower end 102b of the well casing 102, and the middle section 102b of the well casing 102 is a permeable fill material 106 such as gravel or sand. According to the present invention, added to the permeable fill material 106 is a pack material 108 suitable for remediating contaminants which may be present in the groundwater. As in the first preferred embodiment, water is drawn through the lower end 102b of the well casing 102 and thus through the permeable fill material 106 and the pack material 108. In the second preferred embodiment, the water is then reintroduced into the surrounding ground 110 by allowing the water to flow out of the middle section 102c of the well casing 102. In this manner, the water may flow again to the lower end 102b of the well casing where it may again be drawn through the pack material 108 and into the well. In this manner, the water repeatedly exposed to the remediative effects of the pack materials 108, and any contaminants which might be present in the surrounding ground 110 are repeatedly bathed in the water, thereby possibly causing such contaminants to be leached from the ground 110 and a subsequently remediated.

A third preferred embodiment of the present invention is illustrated in FIG. 3. As will be recognized by those skilled in the art, the recirculation of the groundwater may be accomplished with a variety of well configurations. In the third preferred embodiment, water drawn into the well casing 102 is then released from the well casing via a longitudinal member 102d attached to the upper end 102a of the well casing 103. Similar to the second preferred embodiment, surrounding both the lower end 102b of the well casing 102 and the longitudinal member 102d of the well casing 102, is permeable fill material 106 such as gravel or sand. As with the second preferred embodiment, pack material 108 is added to the fill material 106. The longitudinal member 102d thus allows water to be recirculated back through the ground 110 in a manner similar to the second preferred embodiment, although the longitudinal member 102d allows the water to be spread over a greater area, thus expanding the amount of ground 110 which may be remediated.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. In a well consisting essentially of a well casing placed within the interior of a bore hole, said well having a fill material disposed about said well casing and interposed between said well casing and an interior surface of said bore hole, an improvement comprising said fill material is a permeable remediation material having a pack material and a permeable fill material, said pack material being suitable for remediation of contaminants present in groundwater circulated through said permeable fill material in contact with said pack material, said pack material in a plurality of unconsolidated granules wherein each of said plurality of unconsolidated granules is smaller than a distance between said well casing and said interior surface of said bore hole, as well as separate and distinct from said permeable fill material permitting liquid flow through said permeable fill material between said plurality of unconsolidated granules; and said permeable remediation material placed to surround a well inlet.

2. The apparatus of claim 1 wherein the pack material is selected from the group comprising iron, copper, zinc, palladium, minerals containing reducible iron, montmorillonite, nontrinite, titanium oxides, manganese oxides, microbes, enzymes, high adsorption capacity clays, zeolites, montmorillonite, bentonite; surface modified clays, quaternary amine modified clays, hydroxyapatite, calcite, and combinations thereof.

3. An improved method of remediating groundwater and soil using a well consisting essentially of a well casing placed within the interior of a bore hole, said well having a fill material disposed about said well casing and interposed between said well casing and an interior surface of said bore hole, said improvement comprising the steps of providing a permeable remediation material as said fill material, said permeable remediation material having a pack material and a permeable fill material, said pack material being suitable for remediation of contaminants present in groundwater circulated through permeable fill material in contact with said pack material, said pack material in a plurality of unconsolidated granules wherein each of said plurality of unconsolidated granules is smaller than a distance between said well casing and said interior surface of said bore hole, and is separate and distinct from said permeable fill material thereby permitting liquid flow between said plurality of unconsolidated granules; and surrounding a well inlet with said permeable remediation material.

4. The method of claim 3 wherein the step of providing the pack material is selected from the group comprising iron, copper, zinc, palladium, minerals containing reducible iron, montmorillonite, nontrinite, titanium oxides, manganese oxides, microbes, enzymes, high adsorption capacity clays, zeolites, montmorillonite, bentonite; surface modified clays, quaternary amine modified clays, hydroxyapatite, calcite, and combinations thereof.

5. The apparatus of claim 1, wherein said permeable remediation material surrounding said well inlet is topped with an impermeable fill material, followed by a middle section of the permeable remediation material further topped by additional impermeable fill material thereby permitting water drawn through said well inlet to flow through said middle section and recirculate to said well inlet.

6. The method of claim 3, wherein said permeable remediation material surrounding said well inlet is topped with an impermeable fill material, followed by a middle section of the remediation material further topped by additional impermeable fill material permitting water drawn through said well inlet to flow through said middle section and recirculate to said well inlet.

* * * * *